(12) United States Patent  
Mauritz et al.

(10) Patent No.: US 12,185,388 B2
(45) Date of Patent: Dec. 31, 2024

(54) RANDOM ACCESS PREAMBLE DETECTION FOR PROPAGATION DELAY

(71) Applicant: Telefonaktiebolaget LM Ericsson (publ), Stockholm (SE)

(72) Inventors: Oskar Mauritz, Johanneshov (SE); Yang Zhang, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 410 days.

(21) Appl. No.: 17/769,780

(22) PCT Filed: Oct. 16, 2020

(86) PCT No.: PCT/SE2020/050986
§ 371 (c)(1),
(2) Date: Apr. 18, 2022

(87) PCT Pub. No.: WO2021/076038
PCT Pub. Date: Apr. 22, 2021

(65) Prior Publication Data
US 2022/0394780 A1 Dec. 8, 2022

Related U.S. Application Data

(60) Provisional application No. 62/916,974, filed on Oct. 18, 2019.

(51) Int. Cl.
*H04W 74/0833* (2024.01)
*H04W 24/10* (2009.01)
*H04W 74/00* (2009.01)

(52) U.S. Cl.
CPC ....... *H04W 74/0841* (2013.01); *H04W 24/10* (2013.01); *H04W 74/002* (2013.01)

(58) Field of Classification Search
None
See application file for complete search history.

(56) References Cited

U.S. PATENT DOCUMENTS 6,141,373 A 10/2000 Scott
8,064,546 B2 * 11/2011 Jiang .................. H04B 1/59
375/340

(Continued)

FOREIGN PATENT DOCUMENTS

CN 1308427 A 8/2001
CN 103249171 A 8/2013

(Continued)

OTHER PUBLICATIONS

Hui, Liao, "The Algorithm and Realization of Detecting a WCDMA System," Dissertation for the Master Degree in Engineering, Harbin Institute of Technology, Dec. 2009, 58 pages.

(Continued)

*Primary Examiner* — Christopher T Wyllie
(74) *Attorney, Agent, or Firm* — Withrow & Terranova, PLLC

(57) ABSTRACT

Random access preamble detection for propagation delay is described herein. The proposed solution predicts energy levels for a set of hypotheses, compares the predicted energy with measured energy, and selects the hypothesis that minimizes a cost function based on the difference of the predicted energy and the measured energy. Some embodiments of the proposed solution may make it possible to extend cell range by allowing a maximum round-trip time exceeding the period of the random access preamble sequence. For the long preamble formats for Long Term Evolution (LTE) and New Radio (NR), the cell range may be extended beyond 120 kilometers (km). For millimeter wave applications, the cell range may be extended beyond 2.5 km.

13 Claims, 8 Drawing Sheets

(56) References Cited

U.S. PATENT DOCUMENTS

| | | | |
|---|---|---|---|
| 9,819,456 B1* | 11/2017 | Bellorado | H04L 7/042 |
| 2009/0040918 A1 | 2/2009 | Jiang et al. | |
| 2010/0002573 A1 | 1/2010 | Baldemair et al. | |
| 2010/0067511 A1* | 3/2010 | Peters | H04B 1/708 |
| | | | 370/342 |
| 2013/0279404 A1 | 10/2013 | Mazurenko et al. | |
| 2016/0366554 A1 | 12/2016 | Markhovsky et al. | |
| 2017/0006638 A1 | 1/2017 | Sahlin et al. | |
| 2018/0235020 A1* | 8/2018 | Maaref | H04W 8/186 |
| 2019/0285722 A1 | 9/2019 | Markhovsky et al. | |
| 2020/0028768 A1* | 1/2020 | Sadiq | H04W 56/0045 |
| 2021/0068092 A1* | 3/2021 | Abedini | H04W 56/001 |
| 2022/0272760 A1* | 8/2022 | Murray | H04W 74/0833 |
| 2022/0394780 A1* | 12/2022 | Mauritz | H04W 24/10 |

FOREIGN PATENT DOCUMENTS

| | | | | |
|---|---|---|---|---|
| CN | 104811972 A | 7/2015 | | |
| CN | 109788548 A | 5/2019 | | |
| CN | 110301123 A | 10/2019 | | |
| FR | 2851876 A1 | 9/2004 | | |
| WO | WO-2018143892 A1 * | 8/2018 | | H04J 13/107 |
| WO | WO-2018201966 A1 * | 11/2018 | | H04L 5/0007 |

OTHER PUBLICATIONS

Yang, Xiaobin, et al., "Enhanced Preamble Detection for Prach in LTE," IEEE Wireless Communications and Networking Conference, Jul. 15, 2013, pp. 3306-3311.

Zhang, et al., "An Improved Preamble Detection Method for LTE—A PRACH Based on Doppler Frequency Offset Correction," ChinaCom, Jan. 31, 2019, Springer Nature, Switzerland, pp. 573-582.

First Office Action for Chinese Patent Application No. 202080072007.8, mailed May 1, 2024, 15 pages.

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.

Author Unknown, "LTE—The UMTS Long Term Evolution," 2nd Edition, eNodeB PRACH Receiver, Chapter 17.5.2, 2011, John Wiley & Sons Ltd., pp. 398-404.

Ericsson, "R1-1702127: NR PRACH design," 3GPP TSG-RAN WG1 Meeting #88, Feb. 13-17, 2017, Athens, Greece, 19 pages.

LGE, "R1-062306: RACH Sequence Extension Methods for Large Cell Deployment," 3GPP TSG RAN1 LTE WG1 Meeting #46, Aug. 28-Sep. 1, 2006, Tallinn, Estonia, 7 pages.

International Search Report and Written Opinion for International Patent Application No. PCT/SE2020/050986, mailed Feb. 11, 2021, 14 pages.

Notification to Grant for Chinese Patent Application No. 202080072007.8, mailed Sep. 5, 2024, 9 pages.

* cited by examiner

```
400
```

┌─────────────────────────────────────────────────────────────┐
│ APPLY A FFT (OR DFT) ON THE RECEIVED SIGNAL y(w,a) FOR EACH FFT │
│ WINDOW w AND ANTENNA a │
│ 401 │
└─────────────────────────────────────────────────────────────┘
                              ▼
┌─────────────────────────────────────────────────────────────┐
│ FOR EACH OF TWO OR MORE SETS OF ADJACENT (IN TIME) FFT │
│ WINDOWS, COHERENTLY COMBINE THE RECEIVED SIGNALS (AFTER FFT) │
│ FOR THE FFT WINDOWS THAT FORM THE SET TO THEREBY FORM A │
│ COMBINED SIGNAL FOR THE SET │
│ 402 │
└─────────────────────────────────────────────────────────────┘
                              ▼
┌─────────────────────────────────────────────────────────────┐
│ FOR EACH OF TWO OR MORE SETS OF ADJACENT (IN TIME) FFT │
│ WINDOWS, APPLY MATCHED FILTERS TO THE COMBINED SIGNAL FOR │
│ THE SET FOR ONE OR MORE POSSIBLE PREAMBLE SEQUENCES │
│ 404 │
└─────────────────────────────────────────────────────────────┘
                              ▼
┌─────────────────────────────────────────────────────────────┐
│ TRANSFORM THE MATCHED FILTER OUTPUTS TO THE TIME-DOMAIN │
│ 406 │
└─────────────────────────────────────────────────────────────┘
                              ▼
┌─────────────────────────────────────────────────────────────┐
│ NON-COHERENTLY COMBINE THE TIME-DOMAIN MATCHED FILTER │
│ OUTPUTS FROM THE DIFFERENT SETS OF ADJACENT FFT WINDOWS │
│ WITHIN DIFFERENT INTERVALS │
│ 408 │
└─────────────────────────────────────────────────────────────┘
                              ▼
┌─────────────────────────────────────────────────────────────┐
│ COMBINE RESULTS OF STEP 408 TO FORM A COMBINED MATCHED │
│ FILTER OUTPUT FOR THE SET OF ALL FFT WINDOWS │
│ 410 │
└─────────────────────────────────────────────────────────────┘
                              ▼
┌─────────────────────────────────────────────────────────────┐
│ PERFORM PREAMBLE DETECTION (E.G., COMPUTE DECISION VARIABLE │
│ FOR EACH SAMPLE AND DETERMINE WHETHER IT EXCEEDS A │
│ THRESHOLD) │
│ 412 │
└─────────────────────────────────────────────────────────────┘
                              ▼
┌─────────────────────────────────────────────────────────────┐
│ DETERMINE INITIAL ROUND-TRIP-TIME ESTIMATE │
│ 414 │
└─────────────────────────────────────────────────────────────┘
                              ▼
┌─────────────────────────────────────────────────────────────┐
│ DETERMINE TRUE ROUND-TRIP-TIME ESTIMATE │
│ 416 │
└─────────────────────────────────────────────────────────────┘

*FIG. 4*

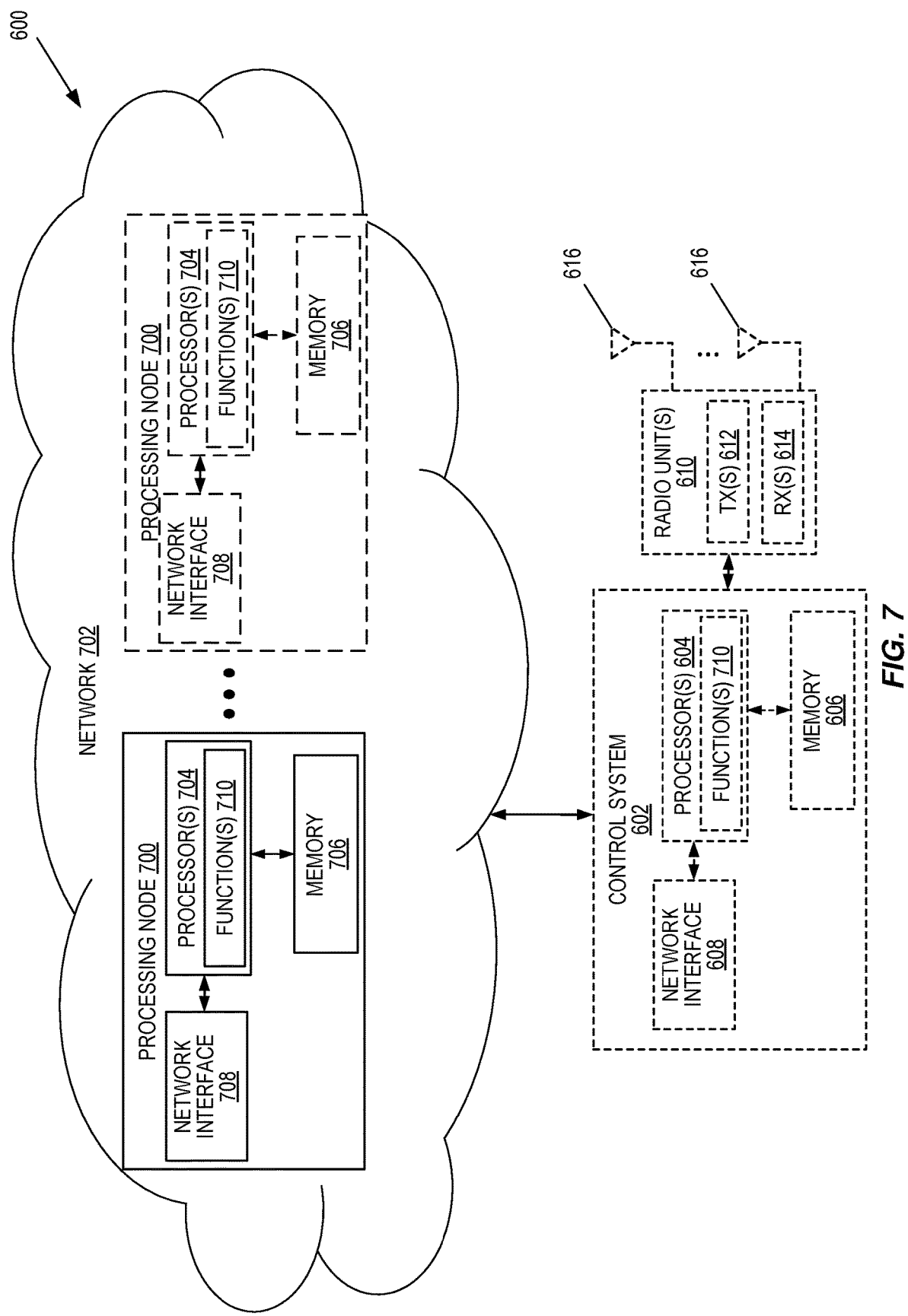

RANDOM ACCESS PREAMBLE DETECTION FOR PROPAGATION DELAY

RELATED APPLICATIONS

This application is a 35 U.S.C. § 371 national phase filing of International Application No. PCT/SE2020/050986, filed Oct. 16, 2020, which claims the benefit of provisional patent application Ser. No. 62/916,974, filed Oct. 18, 2019, the disclosures of which are hereby incorporated herein by reference in their entireties.

TECHNICAL FIELD

The present disclosure relates to random access procedures in wireless communications systems, and in particular to random access preamble detection.

BACKGROUND

Physical Random Access Channel (PRACH) preambles in New Radio (NR) are generated from Zadoff-Chu sequences. A preamble consists of one or more periods of the Zadoff-Chu sequence plus a cyclic prefix.

In a typical PRACH detector, a bandpass filter is followed by a bank of correlators for configured preamble sequences in a cell. The correlator output for different periods, if more than one period, of the periodic preamble may be combined either coherently or non-coherently. In the former case, the complex correlator outputs from the different periods are summed. In the latter case, the power (i.e. the amplitude squared) of the correlator output is summed. Furthermore, the correlator outputs from different receive antennas are added non-coherently.

Once a combined signal is formed from the correlator outputs, a preamble is detected if the power scaled by the estimated noise power for any sample within the possible range of delays in the combined signal exceeds a threshold. The sample with the highest power also gives the estimated time-of-arrival that ideally equals the round-trip time. The Zadoff-Chu sequences have ideal periodic autocorrelation properties that make it possible to estimate the time-of-arrival with high accuracy as long as the delay of the signal is within the period T of the preamble.

One method to accurately determine the time-of-arrival when the maximum round-trip time exceeds the period of the Zadoff-Chu sequence has been described previously. This method distinguishes between two hypotheses:
1. $\mathcal{H}_0$ with time-of-arrival $\tau = \tau'$, $0 \le \tau' < T$, and
2. $\mathcal{H}_1$ with $\tau = \tau' + T$.

This method compares the energy received for the matched filter output sample corresponding to $\tau'$ in an early interval with that in a later interval. The energy values for the early and late intervals are labelled $p(\mathcal{J}_{early})$ and $p(\mathcal{J}_{last})$, respectively. If the energy in the early interval $p(\mathcal{J}_{early})$ is larger than that a later interval $p(\mathcal{J}_{last})$, $\mathcal{H}_0$ is selected. Otherwise, $\mathcal{H}_1$ is selected.

There currently exist certain challenge(s). For some PRACH formats and round-trip-times, the difference in energy between the early and late interval may be small or even opposite to the assumption made for hypothesis selection in the traditional method described above. For example, for PRACH format 1 and three Discrete Fourier Transform (DFT) windows of duration $\tau = 0.8$ milliseconds (ms) starting at 0.6 ms, 1.4 ms and 2.2 ms, the required Signal-to-Noise Ratio (SNR) at a probability of missed detection of 10% for an Additive White Gaussian Noise (AWGN) channel is shown in FIG. 1.

FIG. 1 is a graphical representation of the required SNR at a probability of missed detection of 10% for an AWGN channel under a traditional approach and under an approach according to embodiments described herein. The solid line shows the performance for the traditional method. It is clear that the traditional method works for certain delays, but performance gets worse for round-trip times from 0.5 ms to 0.8 ms. For 0.7 ms, the hypothesis testing does not work for any value of SNR.

SUMMARY

Random access preamble detection for propagation delay is described herein. The proposed solution predicts energy levels for a set of hypotheses, compares the predicted energy with measured energy, and selects the hypothesis that minimizes a cost function based on the difference of the predicted energy and the measured energy.

Certain embodiments may provide one or more of the following technical advantage(s). Some embodiments of the proposed solution may make it possible to extend cell range by allowing a maximum round-trip time exceeding the period of the random access preamble sequence. For the long preamble formats for Long Term Evolution (LTE) and New Radio (NR), the cell range may be extended beyond 120 kilometers (km). For millimeter wave applications, the cell range may be extended beyond 2.5 km.

In some embodiments, a method is performed by a network node for random access preamble detection for propagation delay. The method includes processing a received signal from a wireless communication device over two or more time intervals to detect a random access preamble and determine an initial round-trip-time estimate for the detected random access preamble. The method further includes determining a true round-trip-time estimate for the random access preamble from among a set of hypotheses for the true round-trip-time estimate based on a predicted signal level for at least one signal level detector output sample in at least one of the two or more time intervals for at least one of the set of hypotheses and a measured signal level for the at least one signal level detector output sample in the at least one of the two or more time intervals for the at least one of the set of hypotheses.

In some embodiments, a range of a cell served by the random access node is such that a maximum round-trip-time in the cell exceeds a preamble period of the random access preamble.

In some embodiments, determining the true round-trip-time estimate for the random access preamble comprises determining the predicted signal level for the at least one signal level detector output sample in the at least one of the two or more time intervals for the at least one of the set of hypotheses and selecting one of the set of hypotheses based on the predicted signal level for the at least one signal level detector output sample in the at least one of the two or more time intervals for the at least one of the set of hypotheses and the measured signal level for the at least one signal level detector output sample in the at least one of the two or more time intervals for the at least one of the set of hypotheses.

In some embodiments, the predicted signal level is a predicted energy level, and the measured signal level is a measured energy level.

In some embodiments, the predicted signal level is a predicted signal strength level, and the measured signal level is a measured signal strength level.

In some embodiments, the at least one signal level detector output sample is at least one matched filter output sample.

In some embodiments, selecting the one of the set of hypotheses comprises selecting a one of the set of hypotheses that minimizes a cost function, the cost function being a function of the predicted signal level and the measured signal level.

In some embodiments, processing the received signal comprises applying a Discrete Fourier Transform (DFT) on the received signal for each of a plurality of DFT windows to provide frequency-domain received signals for the plurality of DFT windows, the plurality of DFT windows being grouped into two or more sets of DFT windows. Processing the received signal further comprises, for each set of adjacent DFT windows, combining the frequency-domain received signals for a subset of the plurality of DFT windows that form the set of DFT windows to provide a combined received signal for the set of DFT windows, applying a matched filter to the combined received signal for the set of adjacent DFT windows, the matched filter being for a random access preamble for which detection is being performed, and transforming an output of the matched filter to a time-domain to provide a time-domain matched filter output for the set of adjacent DFT windows. In some embodiments, applying the DFT on the received signal for each of the plurality of DFT windows comprises applying a Fast Fourier Transform (FFT) on the received signal for each of a plurality of FFT windows.

In some embodiments, processing the received signal further comprises, for each of two or more time intervals, combining the time-domain matched filter outputs for the set(s) of DFT windows within the time interval to provide a combined time-domain matched filter output for the time interval and combining the combined time-domain matched filter outputs for the two or more time intervals to provide a further combined time-domain matched filter output. In some embodiments, combining the combined time-domain matched filter outputs for the two or more time intervals comprises combining the combined time-domain matched filter outputs for all of the plurality of DFT windows.

In some embodiments, processing the received signal further comprises performing preamble detection based on the further combined time-domain matched filter output to detect the random access preamble and determining the initial round-trip-time estimate of the detected random access preamble. In some embodiments, performing preamble detection comprises computing a decision variable value for each sample of the further combined time-domain matched filter output and determining that one of the samples of the further combined time-domain matched filter output exceeds a threshold.

In some embodiments, the at least one signal level detector output sample in the at least one of the two or more time intervals comprises, for each of at least one of the two or more time intervals, one of the samples of the combined time-domain matched filter output for the time interval that corresponds to a sample of the further combined time-domain matched filter output that corresponds to a maximum decision variable value from among decision variable values computed for the samples of the further combined time-domain matched filter output.

In some embodiments, a network node is provided. The network node includes processing circuitry configured to cause the network node to process a received signal from a wireless communication device over two or more time intervals to detect a random access preamble and determine an initial round-trip-time estimate for the detected random access preamble. The processing circuitry is further configured to cause the network node to determine a true round-trip-time estimate for the random access preamble from among a set of hypotheses for the true round-trip-time estimate based on a predicted signal level for at least one signal level detector output sample in at least one of the two or more time intervals for at least one of the set of hypotheses and a measured signal level for the at least one signal level detector output sample in the at least one of the two or more time intervals for the at least one of the set of hypotheses.

In some embodiments, the network node further comprises a radio unit configured to receive the received signal from the wireless communication device. In some embodiments, the radio unit is further configured to transmit a signal to the wireless communication device in response to the received signal.

In some embodiments, a range of a cell served by the random access node is such that a maximum round-trip-time in the cell exceeds a preamble period of the random access preamble.

In some embodiments, the processing circuitry is further configured to determine the true round-trip-time estimate for the random access preamble by determining the predicted signal level for the at least one signal level detector output sample in the at least one of the two or more time intervals for the at least one of the set of hypotheses and selecting one of the set of hypotheses based on the predicted signal level for the at least one signal level detector output sample in the at least one of the two or more time intervals for the at least one of the set of hypotheses and the measured signal level for the at least one signal level detector output sample in the at least one of the two or more time intervals for the at least one of the set of hypotheses.

In some embodiments, the predicted signal level is a predicted energy level, and the measured signal level is a measured energy level.

In some embodiments, the predicted signal level is a predicted signal strength level, and the measured signal level is a measured signal strength level.

In some embodiments, the at least one signal level detector output sample is at least one matched filter output sample.

In some embodiments, the processing circuitry is further configured to select the one of the set of hypotheses by selecting a one of the set of hypotheses that minimizes a cost function, the cost function being a function of the predicted signal level and the measured signal level.

In some embodiments, the processing circuitry is further configured to process the received signal by applying a DFT on the received signal for each of a plurality of DFT windows to provide frequency-domain received signals for the plurality of DFT windows, the plurality of DFT windows being grouped into two or more sets of DFT windows. The processing circuitry is further configured to process the received signal by, for each set of adjacent DFT windows, combining the frequency-domain received signals for a subset of the plurality of DFT windows that form the set of DFT windows to provide a combined received signal for the set of DFT windows, applying a matched filter to the combined received signal for the set of adjacent DFT windows, the matched filter being for a random access preamble for which detection is being performed, and transforming an output of the matched filter to a time-domain to provide a time-domain matched filter output for the set of adjacent DFT windows. The processing circuitry is further configured to process the received signal by, for each of two or more time intervals, combining the time-domain matched filter outputs for the set(s) of DFT windows within the time interval to provide a combined time-domain matched filter output for the time interval. The processing circuitry is further configured to process the received signal by combining the combined time-domain matched filter outputs for the two or more time intervals to provide a further combined time-domain matched filter output, performing preamble detection based on the further combined time-domain matched filter output to detect the random access preamble, and determining the initial round-trip-time of the detected random access preamble.

In some embodiments, the processing circuitry is further configured to apply the DFT on the received signal for each of the plurality of DFT windows by applying a FFT on the received signal for each of a plurality of FFT windows.

In some embodiments, the processing circuitry is further configured to combine the combined time-domain matched filter outputs for all of the plurality of DFT windows.

In some embodiments, the processing circuitry is further configured to perform preamble detection by computing a decision variable value for each sample of the further combined time-domain matched filter output and determining that one of the samples of the further combined time-domain matched filter output exceeds a threshold.

In some embodiments, the at least one signal level detector output sample in the at least one of the two or more time intervals comprises, for each of at least one of the two or more time intervals, one of the samples of the combined time-domain matched filter output for the time interval that corresponds to a sample of the further combined time-domain matched filter output that corresponds to a maximum decision variable value from among decision variable values computed for the samples of the further combined time-domain matched filter output.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 is a flow chart that illustrates the operation of a PRACH preamble detector in accordance with at least some aspects of the present disclosure.

FIG. 7 is a schematic block diagram that illustrates a virtualized embodiment of the network node according to some embodiments of the present disclosure.

DETAILED DESCRIPTION

Figure 1:
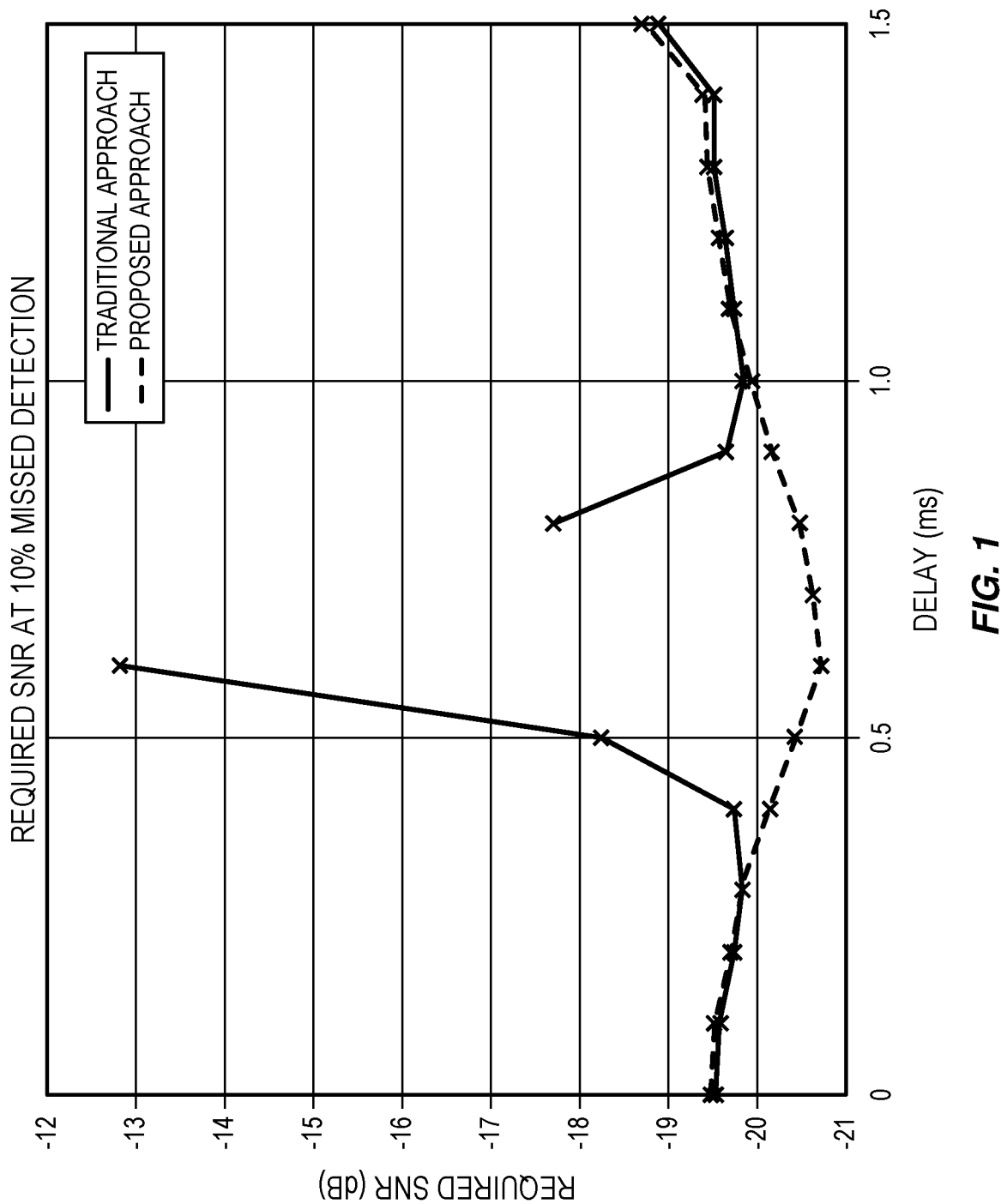
FIG. 1 is a graphical representation of the required Signal-to-Noise Ratio (SNR) at a probability of missed detection of 10% for an Additive White Gaussian Noise (AWGN) channel under a traditional approach and under an approach according to embodiments described herein.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Random access preamble detection for propagation delay is described herein. The proposed solution predicts energy levels for a set of hypotheses, compares the predicted energy with measured energy, and selects the hypothesis that minimizes a cost function based on the difference of the predicted energy and the measured energy.

Certain embodiments may provide one or more of the following technical advantage(s). Some embodiments of the proposed solution may make it possible to extend cell range by allowing a maximum round-trip time exceeding the period of the random access preamble sequence. For the long preamble formats for LTE and NR, the cell range may be extended beyond 120 kilometers (km). For millimeter wave applications, the cell range may be extended beyond 2.5 km.

In some embodiments, the proposed solution includes one or more of the following actions performed by a Physical Random Access Channel (PRACH) detector (e.g., at a network node such as, e.g., a base station such as, e.g., a gNB):
  predicting signal level(s) (e.g., predicted signal strength level(s) or predicted energy level(s)) in at least one time interval for a set of hypotheses and for at least one sample in the signal level detector output (e.g., the matched filter output) that correspond to the delay for a detected peak;
  comparing the predicted signal level(s) with measured signal level(s) (e.g., measured signal strength level(s) or measured energy level(s)); and
  selecting the hypothesis that minimizes a cost function based on the difference of the predicted signal level(s) and the measured signal level(s) in one or several intervals.

Figure 2:
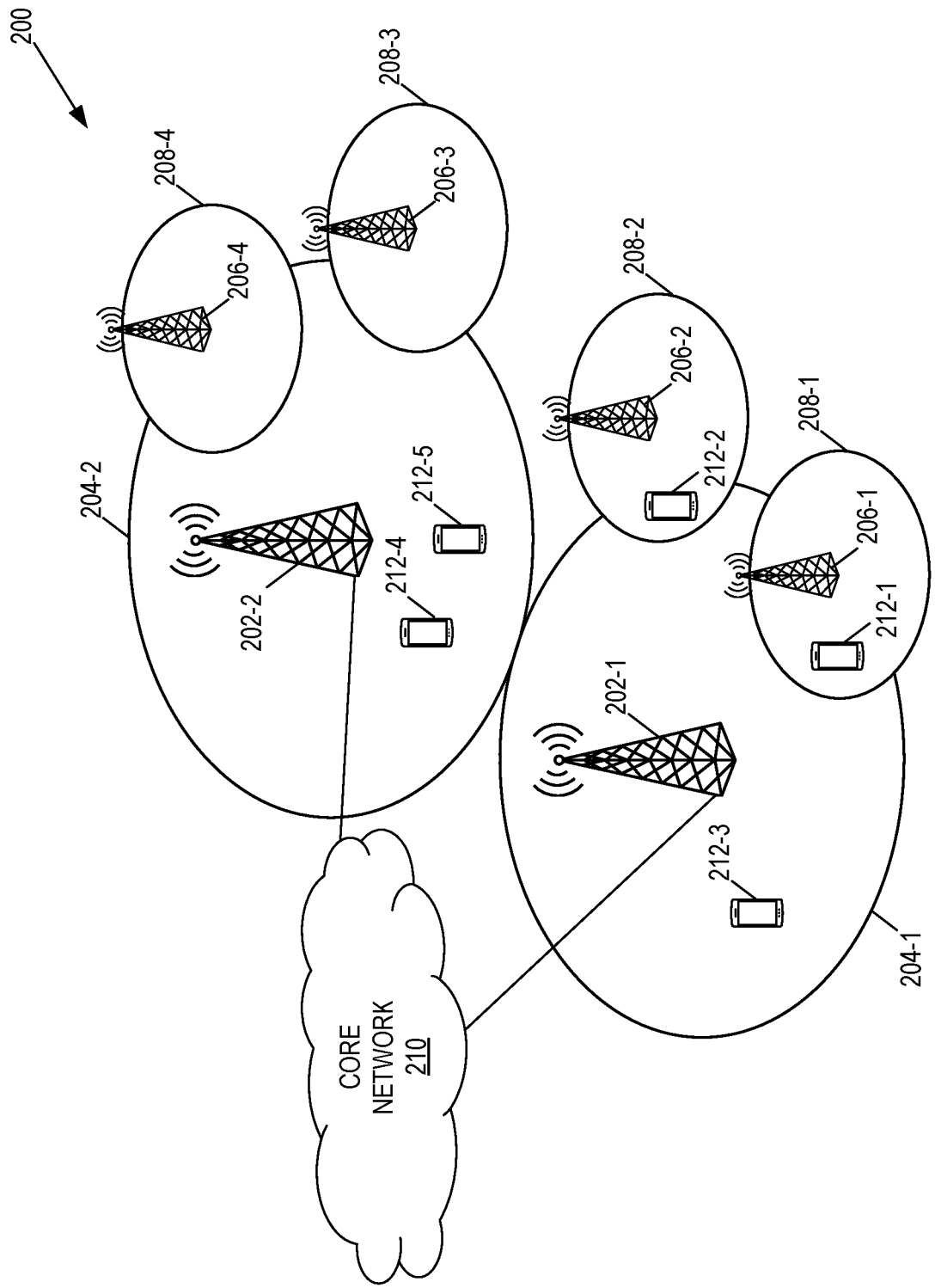
FIG. 2 illustrates one example of a cellular communications system in which embodiments of the present disclosure may be implemented.

In this regard, FIG. 2 illustrates one example of a cellular communications system 200 in which embodiments of the present disclosure may be implemented. In the embodiments described herein, the cellular communications system 200 is a 5G system (5GS) including a NR RAN (also referred to as a Next Generation RAN (NG-RAN)) or LTE RAN (i.e., Evolved Universal Terrestrial Radio Access (E-UTRA) RAN) or an Evolved Packet System (EPS) including a LTE RAN. In this example, the RAN 200 includes base stations 202-1 and 202-2, which in LTE are referred to as eNBs (when connected to EPC) and in 5G NR are referred to as gNBs or ng-eNBs (where ng-eNBs are LTE RAN nodes connected to 5G Core (5GC)), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204.

The RAN 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Now, a description of some example embodiments of the present disclosure is provided. A receiver (e.g., at a network node such as, e.g., a base station 202) applies a Discrete Fourier Transform (DFT) on the received signal in at least two time intervals, each corresponding to one or several DFT windows. Each DFT window has the same duration in time as the preamble period, T. Since delays longer than T will be considered, no cyclic shifts are used to generate the preambles and the cyclic shift index v in some traditional approaches will be dropped in the following.

Let $Y(k, w, a)$ be the received signal after the DFT on antenna a in DFT window w and subcarrier k. The subcarriers within the band of the PRACH are here labelled from 0 to $L_{RA}-1$ where $L_{RA}$ is the length of the Zadoff-Chu sequence.

Next, group the windows into sets $\mathcal{U}_I$ of adjacent windows. Such a set may contain one or several windows. The received signal from the windows that form the set $\mathcal{U}_l$ are combined coherently, i.e. summed, to form a combined signal $$\tilde{Y}(k, l, a) = \sum_{w \in U_l} Y(k, w, a) e^{-j2\pi t_w k},$$

where $t_w$ is the start time of window w and t is measured from the end of the cyclic prefix for a preamble received without any delay. In the following step a matched filter operates on the received signal in frequency domain for each preamble:

$$\Psi_u(k,l,a) = P_u^*(k) \cdot \tilde{Y}(k,l,a), k=0,1,\ldots,L_{RA}-1,$$

where $P_u(k)$ is the DFT of the preamble sequence $$x_u(n) = e^{-\frac{j\pi u n(n+1)}{L_{RA}}},$$

$n=0, 1, \ldots, L_{RA}-1$:

$$P_u(k) = \sum_{n=0}^{L_{RA}-1} x_u(n) e^{-\frac{j2\pi n k}{L_{RA}}}.$$

A time domain representation of the matched filter output, $\psi_u(m, l, a)$ is obtained by $$\psi_u(m, l, a) = \sum_{k=0}^{N-1} \Psi_u(k, l, a) e^{\frac{j2\pi m k}{N}},$$

where $m=0, \ldots, N-1$, N is the size of the Inverse Discrete Fourier Transform (IDFT), $N \geq k$, and $\Psi(k, l, a)$ are set to 0 for $L_{RA} \leq k < N$.

The matched filter output from the different window groups/are further combined non-coherently within different intervals $\mathcal{J}_i$.

$$\phi(m, i, a) = \sum_l |\psi(m, l, a)|^2$$

In a similar way $\phi(m, a)$ for the set of all DFT windows is formed by coherent and/or non-coherent combining.

The noise variance $\sigma_n^2$ can be estimated in different ways. A simple estimator is given by $$\hat{\sigma}_n^2 = \frac{1}{N} \sum_{a=0}^{N_a-1} \sum_{m=0}^{N-1} \phi(m, a)$$

A decision variable $\lambda(m)$ for each sample m is given by $$\lambda(m) = \sum_{a=0}^{N_a-1} \phi(m, a)/\hat{\sigma}_n^2$$

A preamble is detected if the decision variable exceeds a threshold for at least one value of m within the search window.

In case a preamble is detected, the round-trip time $\tau$ is estimated from the value of m corresponding to the maximum value of $\lambda(m)$:

$$\hat{m} = \underset{m}{\mathrm{argmax}}(\lambda(m))$$

An initial estimate $\tau'$ of the round-trip time is given by $$\tau' = \frac{\hat{m}}{N} T$$

For cell ranges that give maximum round-trip times exceeding the preamble period T, hypothesis testing is performed as described in the following to estimate the true time-of-arrival $\tau$:

$N_H$ hypotheses $\mathcal{H}_h, h=0,1,\ldots,N_H-1$ are considered where $\mathcal{H}_h: \tau = \tau' + hT$.

Any hypothesis with $\tau' h T > \tau_{max}$ is discarded; the highest value of h for which this relation is fulfilled may depend on the value of $\tau'$. For example, if $\tau_{max}=1.2$ ms and T=0.8 ms, $\mathcal{H}_1$ is discarded if $\tau' > \tau_{max} - T = 0.4$ ms, otherwise not.

In some embodiments, the measured energy for the sample or samples corresponding to $\hat{m}$ in at least one interval, $\tilde{p}(i)$, are compared with the predicted energy for that interval for the different hypotheses, $\bar{p}_h(i)$. The hypothesis which gives the closest agreement between predicted and measured energy is selected as the true round-trip time $\tau$.

In one embodiment, a prediction of the energy may assume that the received signal amplitude for antenna a, $A_a$, is constant during the reception of the preamble and that the phase of the signal is constant for the set of windows that are coherently combined, $\mathcal{U}_l$. For the appropriate delay in the matched filter, the resulting output is given by $|\psi_u(\hat{m}, l, a)| = A_a M_l$ where $M_l$ is the number of samples of the overlap between the received preamble and the DFT windows in set $\mathcal{U}_l$. Since the number of samples $M_l$ is proportional to the time of overlap $T^\circ (l; \tau)$, $|\psi_u(\hat{m}, l, a)| = A_a' T^\circ (l)$ where $$A_a' = \frac{M_l}{T^\circ(l;\tau)} A_a = \frac{L_{RA}}{T} A_a.$$

Consider the peak energy p in the preamble detector as a random variable due to the contribution from additive noise, corresponding to the measured value $\lambda(\hat{m})$. Then the expectation value of p, $\bar{p}$, is given by $$\bar{p} = \frac{\left( \sum_{a=0}^{N_a-1} A_a'^2 \sum_l T^\circ(l;\tau)^2 + \sigma_n^2 \right)}{\sigma_n^2} = \frac{P}{\sigma_n^2} \sum_l T^\circ(l;\tau)^2 + 1$$

where $P = \sum_{a=0}^{N_a-1} A_a'^2$ is the total received power over all antennas. From the measured value of $\lambda(\hat{m})$ P can be estimated. The expected normalized peak energy in interval i for hypothesis h, $\bar{p}_h(i)$, is given by $$\bar{p}_h(i) = \frac{P}{\sigma_n^2} \sum_l T^\circ(l; \tau' + hT)^2 + \frac{\hat{\sigma}_{n,i}^2}{\sigma_n^2},$$

where $\hat{\sigma}_{n,i}^2$ is the estimated noise energy in interval i.

A cost function $C_h$ for each hypothesis is formed by $$C_h = \sum_i S_h(i) \left( \overline{p}_h(i) - \sum_{a=0}^{N_a-1} \phi(\hat{m}, i, a) \right)^2$$

where $S_h(i)$ is a scale factor that may take the variation of $p_h(i)$ due to noise into account, e.g.

$$S_h(i) = \frac{1}{\sigma^2_{p_h(i)}}$$

Assuming the estimates of $$\frac{P}{\sigma_n^2} \text{ and } \frac{\hat{\sigma}^2_{n,i}}{\sigma_n^2}$$

are correct, the random variable $p_h(i)$ has a non-central $\chi^2$ contribution and the variance of $p_h(i)$ can be shown to be $$\sigma^2_{p_h(i)} = 2\overline{p}_h(i) + \frac{1}{N_a} \frac{\hat{\sigma}^2_{n,i}}{\sigma_n^2}$$

The hypothesis $\mathcal{H}_{\hat{h}}$ that minimizes the cost function $C_h$ is then selected:

$$\hat{h} = \underset{h}{\operatorname{argmin}} C(h)$$

and the round-trip time is estimated $\tau = \tau' + \hat{h}T$.

Several simplifications and variations of the method described above are possible.

Now, an embodiment is described for NR low-band and mid-band base stations. The performance is shown with dashed lines in FIG. 1. A slight variation with LTE PRACH format 1 and only two DFT windows may be used for LTE RAN.

In one embodiment, PRACH format 1 is used and $\tau_{max}=1.2$ ms. There are three intervals, each of them consists of one DFT window and the matched filter outputs from the different windows are combined non-coherently. Hence, i=l=w for w=0, 1, 2. If $\tau' > \tau_{max} - T = 0.4$ ms $\mathcal{H}_0$ is selected without any further calculations and $\tau = \tau'$. Otherwise the calculations are performed as follows to determine the true round-trip time.

Several simplifications to the general method are performed, as follows. The estimated expected normalized peak energy is calculated from the peak energies in intervals 0 and 2 without taking noise into account for the estimation of P and discarding $\hat{\sigma}_{n,i}^2$, i.e.

$$\frac{P}{\sigma_n^2} = \frac{\tilde{p}(0) + \tilde{p}(2)}{T^o(0; \tau' + hT)^2 + T^o(2; \tau' + hT)^2}$$

where $\tilde{p}(i)$ is the measured normalized power in $\mathcal{J}_i$, given by $$\tilde{p}(i) = \sum_{a=0}^{N_a-1} \phi(\hat{m}, i, a)$$

Then $$\overline{p}_h(0) = \frac{P}{\sigma_n^2} T^o(i; \tau' + hT)^2 = (\tilde{p}(0) + \tilde{p}(2))R_h$$

where $R_h$ is the estimated energy ratio between the peak in the first interval and the sum of the peak energies in the first and last intervals:

$$R_h = \frac{T^o(0; \tau' + hT)^2}{T^o(0; \tau' + hT)^2 + T^o(2; \tau' + hT)^2}$$

Choosing $$S_h(i) = \begin{cases} 1, & i = 0 \\ 0, & i = 1, 2 \end{cases}$$

gives the following expression for the cost function:

$$C_h = (\overline{p}_h(0) - \tilde{p}(0))^2$$

Dividing by $\tilde{p}(0) + \tilde{p}(2)$, denoting the measured energy ratio between the first and last window by $$\tilde{R} = \frac{\tilde{p}(0)}{\tilde{p}(0) + \tilde{p}(2)}$$

and using the expression for $\overline{p}_h(0)$ above gives the following expression for the cost function:

$$C_h = (R_h - \tilde{R})^2$$

It is then clear that $\mathcal{H}_0$ is selected for $\tau' < 0.4$ ms if and only if $$|R_0 - \tilde{R}| < |R_1 - \tilde{R}|$$

In another embodiment, the PRACH format is A3 and $\tau_{max}=3T$, so that a cell range of 3.75 km can be supported for a PRACH subcarrier spacing of 120 kHz. There are nine DFT windows that are aligned with the Physical Uplink Shared Channel (PUSCH) symbols in uplink. Three non-overlapping intervals are formed, each with three DFT windows, i.e. the first interval $\mathcal{J}_0$ contains windows w=0, 1, 2, the second interval $\mathcal{J}_1$ contains windows w=3, 4, 5, and the last interval $\mathcal{J}_2$ contains windows w=6, 7, 8. Coherent combining over all DFT windows followed by the absolute square is applied to obtain $\phi(m, i, a)$. Peak energies in the three intervals are then compared with predicted energies for three different hypotheses.

Figure 3:
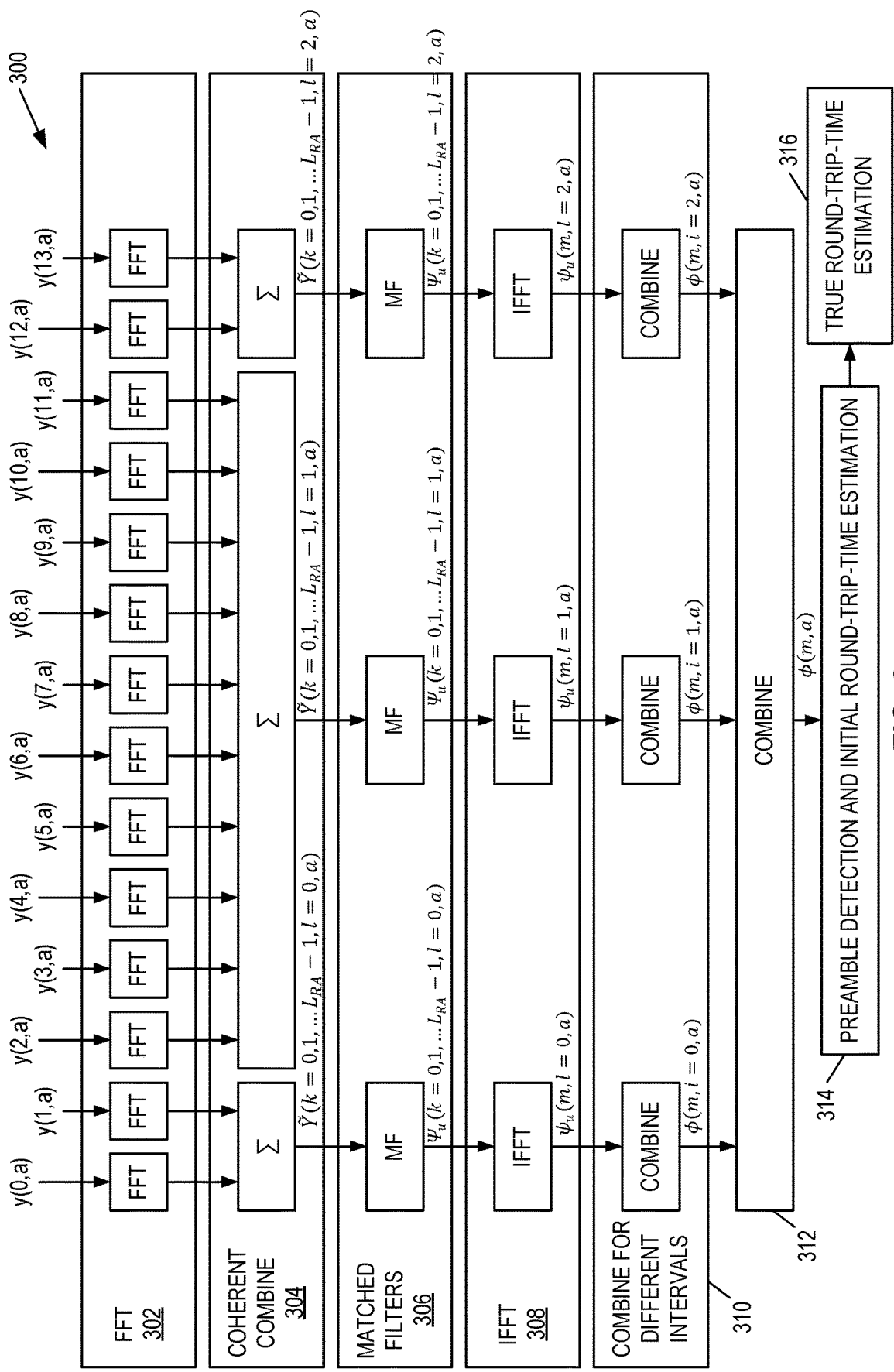
FIG. 3 illustrates one example of a Physical Random Access Channel (PRACH) preamble detector in accordance with at least some aspects of at least some of the embodiments described above.

FIG. 3 illustrates one example of a PRACH preamble detector 300 in accordance with at least some aspects of at least some of the embodiments described above. As illustrated, the PRACH preamble detector 300 includes a number of Fast Fourier Transforms (FFTs) (block 302) (FFT is only an example, any type of Fourier transform or DFT can be used) that correspond to respective FFT (e.g., DFT) windows. Note that while, in this example, there are 14 FFTs corresponding to 14 FFT windows (which as discussed below are grouped into three sets of adjacent FFT windows), the present disclosure is not limited thereto. The number of FFT windows (and thus the number of FFTs) as well as the number of adjacent sets of FFT windows may vary depending on the particular implementation. In general, there are two or more sets of adjacent FFT windows, each including one or more FFT windows, as discussed above. Further, in some embodiments, each FFT window has the same duration in time as the preamble period T, as described above; however, the present disclosure is not limited thereto (i.e., in some embodiments, the FFT window size is not connected to the preamble period).

As discussed above, a received signal on a particular antenna a is input to the PRACH preamble detector 300. A first portion of the received signal y(0, a) that corresponds to a first FFT window is input to a first FFT which then outputs frequency-domain received signals Y(k, w=0, a) for subcarriers k=0, . . . , $L_{RA}-1$ for the respective FFT window (i.e., for w=0) and antenna a, a second portion of the received signal y(1, a) that corresponds to a second FFT window is input to a second FFT which then outputs frequency-domain received signals Y(k,w=1, a) for subcarriers k=0, . . . , $L_{RA}-1$ for the respective FFT window (i.e., for w=1) and antenna a, and so on.

As discussed above, the FFT windows are divided into sets $\mathcal{U}_l$ of adjacent windows, each containing one or more FFT windows. Note that while the FFT windows in a set are adjacent and the sets are adjacent to one another in the example embodiments described herein, the present disclosure is not limited thereto. The sets of FFT windows may not be adjacent (e.g., may be separated) and/or some of the FFT windows in a set may not be adjacent (e.g., may be separated). In the example of FIG. 3, there are three sets. The first set includes the first two FFT windows, the second set includes the next ten FFT windows, and the last set includes the last two FFT windows. Note that this is only any example. Any number of two or more sets may be used. Further, the number of FFT windows in each set and/or the number of FFT and window start time can vary depending on the particular implementation. For each set of adjacent FFT windows, the frequency-domain received signals from the FFT windows that form the set $\mathcal{U}_l$ are combined coherently (block 304), i.e. summed, to form a combined signal $$\tilde{Y}(k, l, a) = \sum_{w \in U_l} Y(k, w, a)e^{-j2\pi t_w k},$$

where $t_w$ is the start time of window w and t is measured from the end of the cyclic prefix for a preamble received without any delay. In the following step, for each set of adjacent FFT windows, a matched filter operates on the received signal in frequency domain for each preamble (block 306):

$$\Psi_u(k,l,a) = P_u^*(k) \cdot \tilde{Y}(k,l,a), k=0,1, \ldots ,L_{RA}-1,$$

where $P_u(k)$ is the DFT of the preamble sequence $$x_u(n) = e^{-\frac{j\pi un(n+1)}{L_{RA}}},$$

n=0, 1, . . . , $L_{RA}-1$:

$$P_u(k) = \sum_{n=0}^{L_{RA}-1} x_u(n)e^{-\frac{j2\pi nk}{L_{RA}}}.$$

A time domain representation of the matched filter output, $\psi_u(m, l, a)$ is obtained by Inverse Fast Fourier Transform (IFFT) (e.g., IDFT) (block 308)

$$\psi_u(m, l, a) = \sum_{k=0}^{N-1} \Psi_u(k, l, a)e^{\frac{j2\pi mk}{N}},$$

where N is the size of the IFFT, N≥k and $\psi_u(k, l, a)$ are set to 0 for $L_{RA} \leq k < N$.

Note that, up until this point, the architecture of the preamble detector (i.e., the FFT, coherent combine, matched filters, and IFFT) is only an example. As will be appreciated by one of skill in the art, other variants may be used (e.g., a variant with no FFT/IFFT at all).

The matched filter outputs from the different FFT window sets 1 are further combined non-coherently within different intervals $\mathcal{J}_i$ (block 310).

$$\phi(m, i, a) = \sum |\psi(m, l, a)|^2$$

Note that in the example of FIG. 3, the different intervals $\mathcal{J}_i$ correspond to the different sets of adjacent FFT windows. So, in the example of FIG. 3, there are three sets of adjacent FFT windows and three corresponding time intervals. However, the present disclosure is not limited thereto. Each of the intervals $\mathcal{J}_i$ may span one or more sets of adjacent FFT windows. In a similar way $\phi(m, a)$ for the set of all FFT windows is formed by coherent and/or non-coherent combining (block 312).

The PRACH preamble detector then performs preamble detection and initial round-trip time estimation (block 314). For example, as discussed above, the noise variance $\sigma_n^2$ can be estimated in different ways. A simple estimator is given by $$\hat{\sigma}_n^2 = \frac{1}{N}\sum_{a=0}^{N_a-1}\sum_{m=0}^{N-1}\phi(m, a)$$

A decision variable $\lambda(m)$ for each sample m is given by $$\lambda(m) = \sum_{a=0}^{N_a-1}\phi(m, a)/\hat{\sigma}_n^2$$

A preamble is detected if the decision variable exceeds a threshold for at least one value of m within the search window.

In case a preamble is detected, the round-trip time τ is estimated from the value of m corresponding the maximum value of A(m):

$$\hat{m} = \underset{m}{\mathrm{argmax}}(\lambda(m))$$

An initial estimate τ' of the round-trip time is given by $$\tau' = \frac{\hat{m}}{N}T$$

As discussed above, for cell ranges that give maximum round-trip times exceeding the preamble period T, the PRACH preamble detector performs hypothesis testing as described above to estimate the true time-of-arrival τ (block 316). As discussed above, $N_H$ hypotheses $\mathcal{H}_h$, h=0, 1, ..., $N_H$–1 are considered where $$\mathcal{H}_h: \tau = \tau' + hT.$$

In some embodiments, any hypothesis with $\tau'+hT > \tau_{max}$ is discarded. The highest value of h for which this relation is fulfilled may depend on the value of τ'. For example, if $\tau_{max}$=1.2 ms and τ=0.8 ms, $\mathcal{H}_1$ is discarded if $\tau' > \tau_{max} - \tau$=0.4 ms, otherwise not.

As discussed above, in some embodiments, the measured energy for the sample or samples corresponding to m̂ in at least one interval, p̂(i), are compared with the predicted energy for that interval for the different hypotheses, $\bar{p}_h(i)$. The hypothesis which gives the closest agreement between predicted and measured energy is selected as the true round-trip time τ. The additional details described above (e.g., the details regarding the possible cost functions that may be used) are also applicable here.

FIG. 4 is a flow chart that illustrates the operation of a PRACH preamble detector (e.g., the PRACH preamble detector 300 of FIG. 3) in accordance with at least some aspects of the present disclosure. As illustrated, the preamble detector processes a received signal (e.g., a received signal y from antenna a) to detect a random access preamble (e.g., a PRACH preamble) and determine an initial round-trip time estimate for the detected random access preamble (step 400). While not being limited thereto, in some embodiments, this processing in step 400 by the preamble detector is as described above. In particular, in some embodiments, the processing of step 400 includes steps 401-414.

More specifically, the PRACH preamble detector applies a FFT (e.g., a DFT) to the received signal for each of multiple FFT windows (step 401). For each of two or more sets of adjacent FFT windows, the resulting frequency domain received signals for the FFT windows in the set are (e.g., coherently) combined (e.g., summed) to form a combined received signal for the set (step 402). For each set, matched filters are applied to the combined received signal for the set for one or more possible random access preamble sequences (step 404). The outputs of the matched filters are transformed to the time-domain (406). Note that steps 401-406 are only an example. As will be appreciated by one of skill in the art, other variants may be used (e.g., not using any FFT/IFFT at all).

For each set, the time-domain outputs of the matched filters for that set are non-coherently combined (step 408). In this manner, different time-domain matched filter outputs are obtained for multiple time intervals that, in the example of FIG. 3, correspond to the multiple FFT window sets (but are not limited thereto). The time-domain matched filter outputs from step 408 are combined to provide a time-domain matched filter output for the set of all FFT windows (step 410). Preamble detection is then performed using the combined time-domain matched filter output from step 410 (e.g., decision variables are computed for each sample and a preamble is detected for any of these decision variables exceed a threshold) (step 412). The PRACH preamble detector then determines an initial round-trip time estimate τ' (e.g., based on the sample(s) that correspond to the maximum decision variable value(s)) (step 414).

Figure 5:
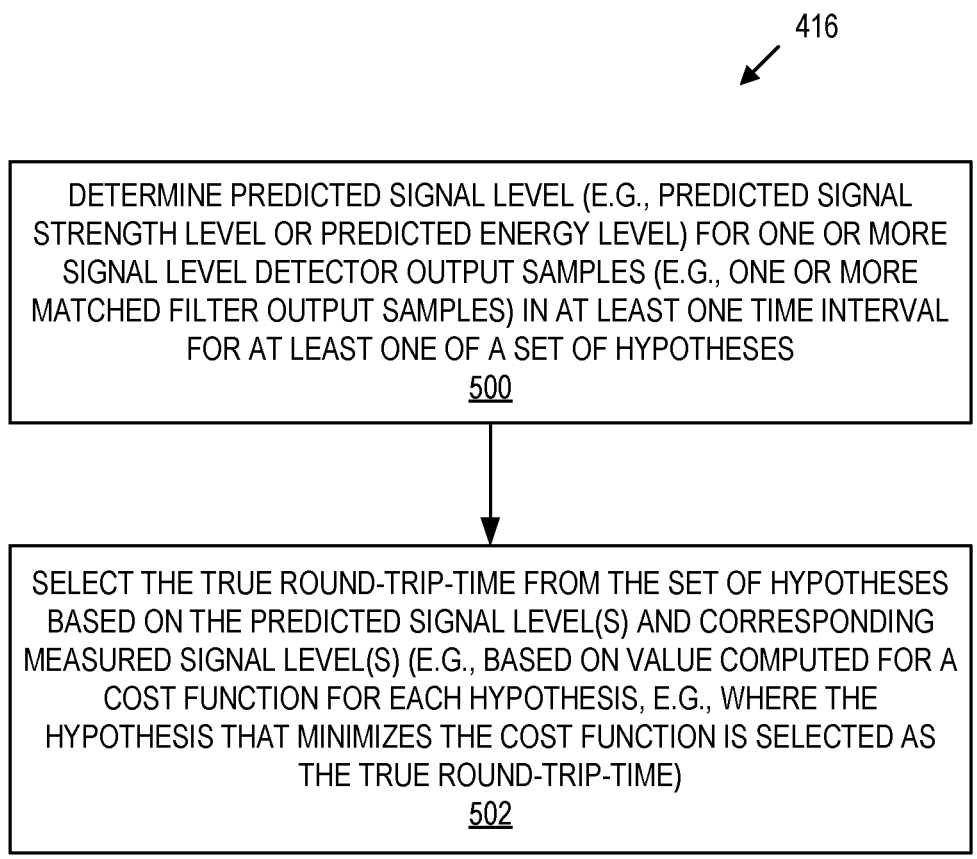
FIG. 5 is a flow chart that illustrates the operation of the PRACH preamble detector to determine a true round-trip time estimate.

The PRACH preamble detector then determines the true round-trip time estimate (step 416). FIG. 5 illustrates one example of step 416.

FIG. 5 is a flow chart that illustrates the operation of the PRACH preamble detector to determine a true round-trip time estimate. As illustrated in FIG. 5, in order to determine the true round-trip time estimate, the PRACH preamble detector determines a predicted signal level (e.g., a predicted signal strength level or a predicted energy level) for one or more signal level detector output samples (e.g., one or more matched filter output samples, e.g., of the matched filter outputs of step 408) in at least one time interval for at least one of a set of $N_H$ hypotheses $\mathcal{H}_h$ (where $\mathcal{H}_h$: τ=τ'+hT) (step 500).

Note that while in the example embodiments described above, the predicted signal level is a predicted energy level, the present disclosure is not limited thereto. "Energy" normally means squared amplitude; however, some equivalent variables (e.g., absolute amplitude) can be used instead. Thus, the term "signal level" is used herein to encompass energy level or any such equivalent or similar variable. Further, in the example embodiments described above, the one or more signal level detector output samples are matched filter output samples; however, the present disclosure is not limited thereto.

The use of the FFT, coherent combine, matched filters, and IFFT as described above with respect to FIGS. 3 and 4 are only an example. In other variations, the signal level measurements used for preamble detection may be measurements other than matched filter outputs, as will be appreciated by one of skill in the art. In this regard, the term "signal level detector output sample" is used to encompass a matched filter output sample or an output sample of any other type of signal level detector used for preamble detection.

The random access preamble detector selects one of the set of $N_H$ hypotheses $\mathcal{H}_h$, h=0, 1, ..., $N_H$–1 based on: the predicted energy level for the one or more signal level detector output samples (e.g., the one or more matched filter output samples, e.g., of the matched filter outputs of step 408) in the at least one time interval for the at least one of the set of $N_H$ hypotheses $\mathcal{H}_h$ and a measured energy level for the one or more signal level detector output samples (e.g., the one or more matched filter output samples) in the at least one time interval for the at least one of the set of $N_H$ hypotheses $\mathcal{H}_h$ (502). Note that the details described above related to determining the true round-trip time by performing a hypothesis selection based on the predicted versus measured energy levels are applicable here.

Figure 6:
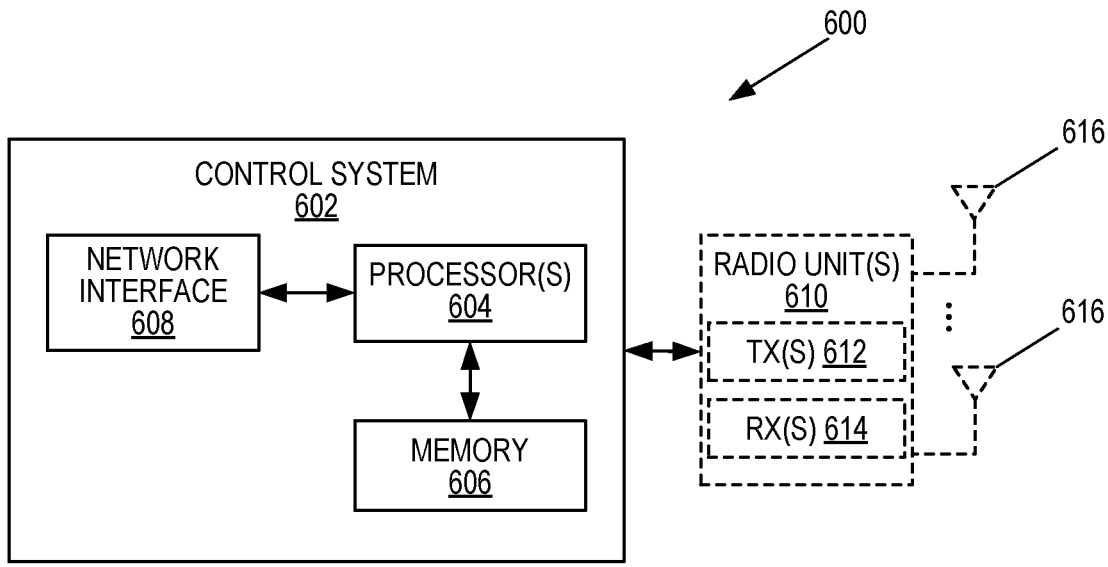
FIG. 6 is a schematic block diagram of a network node according to some embodiments of the present disclosure.

FIG. 6 is a schematic block diagram of a network node 600 according to some embodiments of the present disclosure. Optional features are represented by dashed boxes. The network node 600 may be, for example, a base station 202 or 206 or a network node that implements all or part of the functionality of the base station 202 or gNB described herein. As illustrated, the network node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry.

In addition, the network node 600 may include one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The random access preamble detector (e.g., the PRACH preamble detector) described above and, in particular, the method of performing random access preamble detection described above may be implemented in the one or more processors 604, implemented in the radio unit(s) 610, or implemented partially in the radio unit(s) 610 and partially in the one or more processors 604. In some embodiments, the function(s) are implemented in software that is stored, e.g., in the memory 606 and executed by the one or more processors 604.

FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 may include the control system 602 and/or the one or more radio units 610, as described above. The control system 602 may be connected to the radio unit(s) 610 via, for example, an optical cable or the like. The network node 600 includes one or more processing nodes 700 coupled to or included as part of a network(s) 702. If present, the control system 602 or the radio unit(s) 610 are connected to the processing node(s) 700 via the network 702. Each processing node 700 includes one or more processors 704 (e.g., CPUs, ASICs, FPGAs, and/or the like), memory 706, and a network interface 708.

In this example, functions 710 of the network node 600 (e.g., at least some of the functionality of the random access preamble detector described herein) may be implemented at the one or more processing nodes 700 or distributed across the one or more processing nodes 700 and the control system 602 and/or the radio unit(s) 610 in any desired manner. In some particular embodiments, some or all of the functions 710 of the network node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicates directly with the processing node(s) 700 via an appropriate network interface(s).

In some embodiments, a computer program including instructions which, when executed by at least one processor, causes the at least one processor to carry out the functionality of the network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
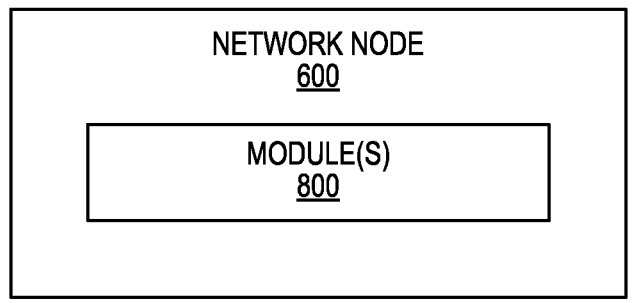
FIG. 8 is a schematic block diagram of the network node according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provide the functionality of the network node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
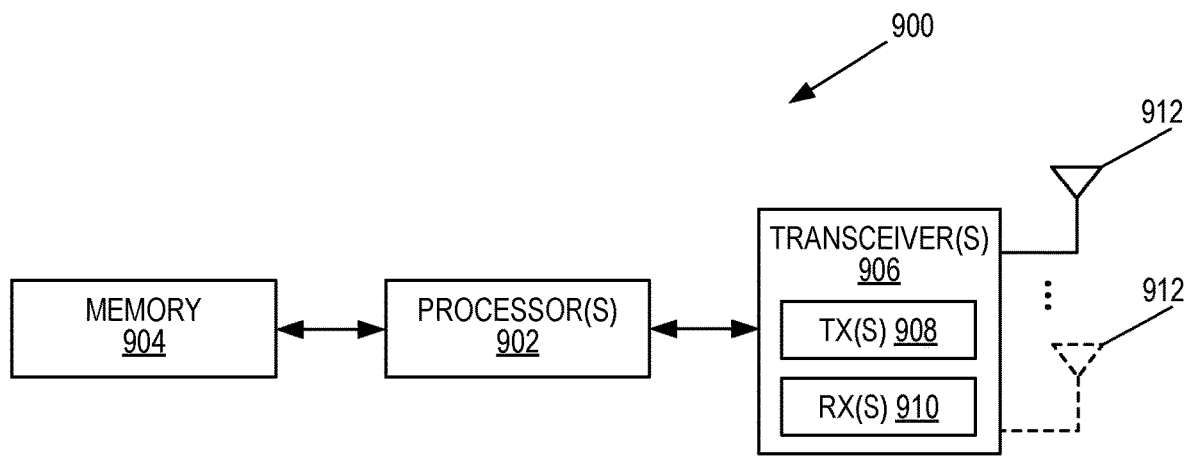
FIG. 9 is a schematic block diagram of a wireless communication device according to some embodiments of the present disclosure.

FIG. 9 is a schematic block diagram of a wireless communication device 900 according to some embodiments of the present disclosure. As illustrated, the wireless communication device 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the wireless communication device 900 described above may be fully or partially implemented in software that is, e.g., stored in the memory 904 and executed by the processor(s) 902. Note that the wireless communication device 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, a computer program including instructions which, when executed by at least one processor, causes the at least one processor to carry out the functionality of the wireless communication device 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
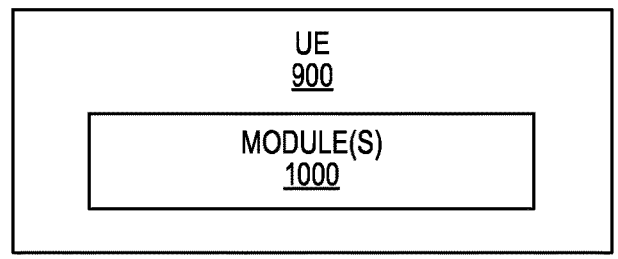
FIG. 10 is a schematic block diagram of the wireless communication device according to some other embodiments of the present disclosure.

FIG. 10 is a schematic block diagram of the wireless communication device 900 according to some other embodiments of the present disclosure. The wireless communication device 900 includes one or more modules 1000, each of which is implemented in software. The module(s) 1000 provide the functionality of the wireless communication device 900 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Embodiment 1: A method performed by a radio access node for random access preamble detection for extended cell range, the method comprising: processing (400) a received signal from a wireless communication device over two or more time intervals to detect a random access preamble and determine an initial round-trip-time estimate for the detected random access preamble; and determining (416) a true round-trip-time estimate for the random access preamble from among a set of hypotheses for the true round-trip-time estimate based on: a predicted signal level for at least one signal level detector output sample in at least one of the two or more time intervals for at least one of the set of hypotheses; and a measured signal level for the at least one signal level detector output sample in the at least one of the two or more time intervals for the at least one of the set of hypotheses.

Embodiment 2: The method of embodiment 1 wherein range of a cell served by the random access node is such that a maximum round-trip-time in the cell exceeds a preamble period of the random access preamble.

Embodiment 3: The method of any of embodiments 1 to 2 wherein determining (416) the true round-trip-time estimate for the random access preamble comprises: determining (500) the predicted signal level for the at least one signal level detector output sample in the at least one of the two or more time intervals for the at least one of the set of hypotheses; and selecting (502) one of the set of hypotheses based on the predicted signal level for the at least one signal level detector output sample in the at least one of the two or more time intervals for the at least one of the set of hypotheses and the measured signal level for the at least one signal level detector output sample in the at least one of the two or more time intervals for the at least one of the set of hypotheses.

Embodiment 4: The method of embodiment 3 wherein the predicted signal level is a predicted energy level, and the measured signal level is a measured energy level.

Embodiment 5: The method of embodiment 3 wherein the predicted signal level is a predicted signal strength level, and the measured signal level is a measured signal strength level.

Embodiment 6: The method of embodiment 3 to 5 wherein the at least one signal level detector output sample is at least one matched filter output sample.

Embodiment 7: The method of any of embodiments 3 to 6 wherein selecting (502) the one of the set of hypotheses comprises selecting a one of the set of hypotheses that minimizes a cost function, the cost function being a function of the predicted signal level and the measured signal level.

Embodiment 8: The method of any of embodiments 1 to 7 wherein processing (400) the received signal comprises: applying (401) a DFT on the received signal for each of a plurality of DFT windows to provide frequency-domain received signals for the plurality of DFT windows, the plurality of DFT windows being grouped into two or more sets of DFT windows; for each set of adjacent DFT windows: combining (402) the frequency-domain received signals for a subset of the plurality of DFT windows that form the set of DFT windows to provide a combined received signal for the set of DFT windows; applying (404) a matched filter to the combined received signal for the set of adjacent DFT windows, the matched filter being for a random access preamble for which detection is being performed; and transforming (406) an output of the matched filter to the time-domain to provide a time-domain matched filter output for the set of adjacent DFT windows.

Embodiment 9: The method of embodiment 8 wherein applying (401) the DFT on the received signal for each of the plurality of DFT windows comprises applying a Fast Fourier Transform, FFT, on the received signal for each of a plurality of FFT windows.

Embodiment 10: The method of any of embodiments 8 to 9 wherein processing (400) the received signal further comprises: for each of two or more time intervals, combining (408) the time-domain matched filter outputs for the set(s) of DFT windows within the time interval to provide a combined time-domain matched filter output for the time interval; and combining (410) the combined time-domain matched filter outputs for the two or more time intervals (i.e., for all of the plurality of DFT windows) to provide a further combined time-domain matched filter output.

Embodiment 11: The method of embodiment 10 wherein combining (410) the combined time-domain matched filter outputs for the two or more time intervals comprises combining (410) the combined time-domain matched filter outputs for all of the plurality of DFT windows.

Embodiment 12: The method of any of embodiments 10 to 11 wherein processing (400) the received signal further comprises: performing (412) preamble detection based on the further combined time-domain matched filter output to detect the random access preamble; and determining (414) the initial round-trip-time estimate of the detected random access preamble.

Embodiment 13: The method of embodiment 12 wherein: performing (412) preamble detection comprises: computing a decision variable value for each sample of the further combined time-domain matched filter output; and determining that one of the samples of the further combined time-domain matched filter output exceeds a threshold.

Embodiment 14: The method of embodiment 13 wherein the at least one signal level detector output sample in the at least one of the two or more time intervals comprises, for each of at least one of the two or more time intervals: one of the samples of the combined time-domain matched filter output for the time interval that corresponds to a sample of the further combined time-domain matched filter output that corresponds to a maximum decision variable value from among decision variable values computed for the samples of the further combined time-domain matched filter output.

Embodiment 15: A radio access node adapted to perform the method of any of embodiments 1 to 14.

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GC Fifth Generation Core
- 5GS Fifth Generation System
- AMF Access and Mobility Function
- ASIC Application Specific Integrated Circuit
- AUSF Authentication Server Function
- AWGN Additive White Gaussian Noise
- CPU Central Processing Unit
- DFT Discrete Fourier Transform
- DSP Digital Signal Processor
- eNB Enhanced or Evolved Node B
- EPS Evolved Packet System
- E-UTRA Evolved Universal Terrestrial Radio Access
- FFT Fast Fourier Transform
- FPGA Field Programmable Gate Array
- gNB New Radio Base Station
- gNB-CU New Radio Base Station Central Unit
- gNB-DU New Radio Base Station Distributed Unit
- HSS Home Subscriber Server
- IDFT Inverse Discrete Fourier Transform
- IFFT Inverse Fast Fourier Transform
- IoT Internet of Things
- LTE Long Term Evolution
- MME Mobility Management Entity
- MTC Machine Type Communication
- NEF Network Exposure Function
- NF Network Function
- NG-RAN Next Generation Radio Access Network
- NR New Radio
- NRF Network Function Repository Function
- NSSF Network Slice Selection Function
- PC Personal Computer
- PCF Policy Control Function
- P-GW Packet Data Network Gateway
- PRACH Physical Random Access Channel
- PUSCH Physical Uplink Shared Channel
- RAM Random Access Memory
- RAN Radio Access Network
- ROM Read Only Memory
- RRH Remote Radio Head
- RU Round Trip Time
- SCEF Service Capability Exposure Function
- SMF Session Management Function
- SNR Signal-to-Noise Ratio
- UDM Unified Data Management
- UE User Equipment
- UPF User Plane Function Those skilled in the art will recognize improvements and modifications to the embodiments of the present disclosure. All such improvements and modifications are considered within the scope of the concepts disclosed herein.

What is claimed is:

1. A method performed by a network node for random access preamble detection for propagation delay, the method comprising:
   processing a received signal from a wireless communication device over two or more time intervals to detect a random access preamble and determine an initial round-trip-time estimate for the detected random access preamble; and
   determining a true round-trip-time estimate for the random access preamble from among a set of hypotheses for the true round-trip-time estimate based on:
      a predicted signal level for at least one signal level detector output sample in at least one of the two or more time intervals for at least one of the set of hypotheses; and
      a measured signal level for the at least one signal level detector output sample in the at least one of the two or more time intervals for the at least one of the set of hypotheses;
   wherein determining the true round-trip-time estimate for the random access preamble comprises:
      determining the predicted signal level for the at least one signal level detector output sample in the at least one of the two or more time intervals for the at least one of the set of hypotheses; and
      selecting one of the set of hypotheses based on the predicted signal level for the at least one signal level detector output sample in the at least one of the two or more time intervals for the at least one of the set of hypotheses and the measured signal level for the at least one signal level detector output sample in the at least one of the two or more time intervals for the at least one of the set of hypotheses;
   wherein selecting the one of the set of hypotheses comprises selecting a one of the set of hypotheses that minimizes a cost function, the cost function being a function of the predicted signal level and the measured signal level.

2. The method of claim 1 wherein a range of a cell served by the random access node is such that a maximum round-trip-time in the cell exceeds a preamble period of the random access preamble.

3. The method of claim 1 wherein the predicted signal level is a predicted energy level, and the measured signal level is a measured energy level.

4. The method of claim 1 wherein the predicted signal level is a predicted signal strength level, and the measured signal level is a measured signal strength level.

5. The method of claim 1 wherein the at least one signal level detector output sample is at least one matched filter output sample.

6. The method of claim 1 wherein processing the received signal comprises:
   applying a Discrete Fourier Transform, DFT, on the received signal for each of a plurality of DFT windows to provide frequency-domain received signals for the plurality of DFT windows, the plurality of DFT windows being grouped into two or more sets of DFT windows;
   for each set of adjacent DFT windows:
      combining the frequency-domain received signals for a subset of the plurality of DFT windows that form the set of DFT windows to provide a combined received signal for the set of DFT windows;
      applying a matched filter to the combined received signal for the set of adjacent DFT windows, the matched filter being for a random access preamble for which detection is being performed; and
      transforming an output of the matched filter to a time-domain to provide a time-domain matched filter output for the set of adjacent DFT windows.

7. The method of claim 6 wherein applying the DFT on the received signal for each of the plurality of DFT windows comprises applying a Fast Fourier Transform, FFT, on the received signal for each of a plurality of FFT windows.

8. The method of claim 6 wherein processing the received signal further comprises:
- for each of two or more time intervals, combining the time-domain matched filter outputs for the set(s) of DFT windows within the time interval to provide a combined time-domain matched filter output for the time interval; and
- combining the combined time-domain matched filter outputs for the two or more time intervals to provide a further combined time-domain matched filter output.

9. The method of claim 8 wherein combining the combined time-domain matched filter outputs for the two or more time intervals comprises combining the combined time-domain matched filter outputs for all of the plurality of DFT windows.

10. The method of claim 8 wherein processing the received signal further comprises:
- performing preamble detection based on the further combined time-domain matched filter output to detect the random access preamble; and
- determining the initial round-trip-time estimate of the detected random access preamble.

11. The method of claim 10 wherein performing preamble detection comprises:
- computing a decision variable value for each sample of the further combined time-domain matched filter output; and
- determining that one of the samples of the further combined time-domain matched filter output exceeds a threshold.

12. The method of claim 11 wherein the at least one signal level detector output sample in the at least one of the two or more time intervals comprises, for each of at least one of the two or more time intervals:
- one of the samples of the combined time-domain matched filter output for the time interval that corresponds to a sample of the further combined time-domain matched filter output that corresponds to a maximum decision variable value from among decision variable values computed for the samples of the further combined time-domain matched filter output.

13. A network node, comprising:
processing circuitry configured to cause the network node to:
- process a received signal from a wireless communication device over two or more time intervals to detect a random access preamble and determine an initial round-trip-time estimate for the detected random access preamble; and
- determine a true round-trip-time estimate for the random access preamble from among a set of hypotheses for the true round-trip-time estimate based on:
  - a predicted signal level for at least one signal level detector output sample in at least one of the two or more time intervals for at least one of the set of hypotheses; and
  - a measured signal level for the at least one signal level detector output sample in the at least one of the two or more time intervals for the at least one of the set of hypotheses;

wherein determining the true round-trip-time estimate for the random access preamble comprises the processing circuitry being further configured to cause the network node to:
- determine the predicted signal level for the at least one signal level detector output sample in the at least one of the two or more time intervals for the at least one of the set of hypotheses; and
- select one of the set of hypotheses based on the predicted signal level for the at least one signal level detector output sample in the at least one of the two or more time intervals for the at least one of the set of hypotheses and the measured signal level for the at least one signal level detector output sample in the at least one of the two or more time intervals for the at least one of the set of hypotheses;
- wherein selecting the one of the set of hypotheses comprises the processing circuitry being further configured to cause the network node to: select a one of the set of hypotheses that minimizes a cost function, the cost function being a function of the predicted signal level and the measured signal level.

* * * * *